United States Patent

[11] 3,591,273

| [72] | Inventors | Hiroshi Hirata;<br>Yoshihisa Hayashi, both of Sakai-shi, Osaka, Japan |
|---|---|---|
| [21] | Appl. No. | 801,076 |
| [22] | Filed | Feb. 20, 1969 |
| [45] | Patented | July 6, 1971 |
| [73] | Assignee | Minolta Camera Kabushiki Kaisha Osaka, Japan |
| [32] | Priority | Feb. 26, 1968 |
| [33] | | Japan |
| [31] | | 43/12078 |

[54] INTERLOCK DEVICE FOR MULTIPLE SPEED MOTION PICTURE CAMERA UTILIZING EXTERIOR POWER SOURCE
4 Claims, 5 Drawing Figs.

[52] U.S. Cl. .................................................. 352/180
[51] Int. Cl. ........................................................ G03b 19/18

[50] Field of Search........ ............ .... 352/131, 180, 244; 318/442

[56] References Cited
FOREIGN PATENTS

| 1,136,571 | 9/1962 | Germany...................... | 352/180 |
| 1,158,364 | 11/1963 | Germany...................... | 352/180 |

Primary Examiner—S. Clement Swisher
Attorney—Watson, Cole, Grindle & Watson

ABSTRACT: An interlock device for a multiple speed electrically operated motion picture camera of the type which requires an external power source for operation at its highest speed. The speed change switch includes a linkage which senses the presence of the plug of the external power source in the receptacle provided thereof and prevents the setting of the switch at the highest speed when the external power source is not connected.

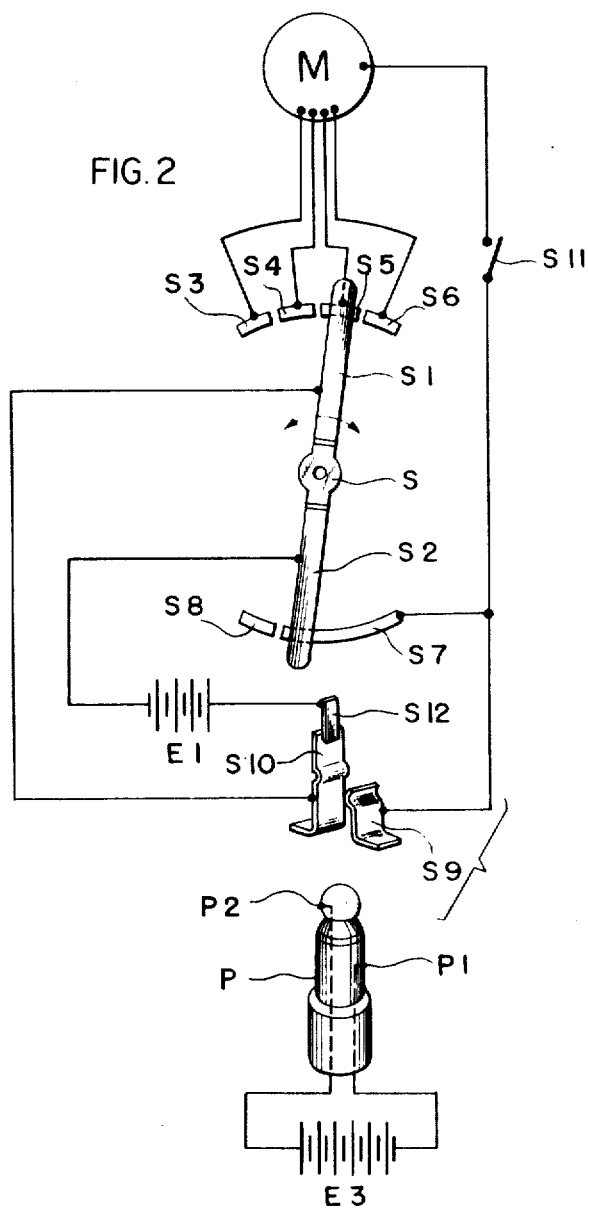

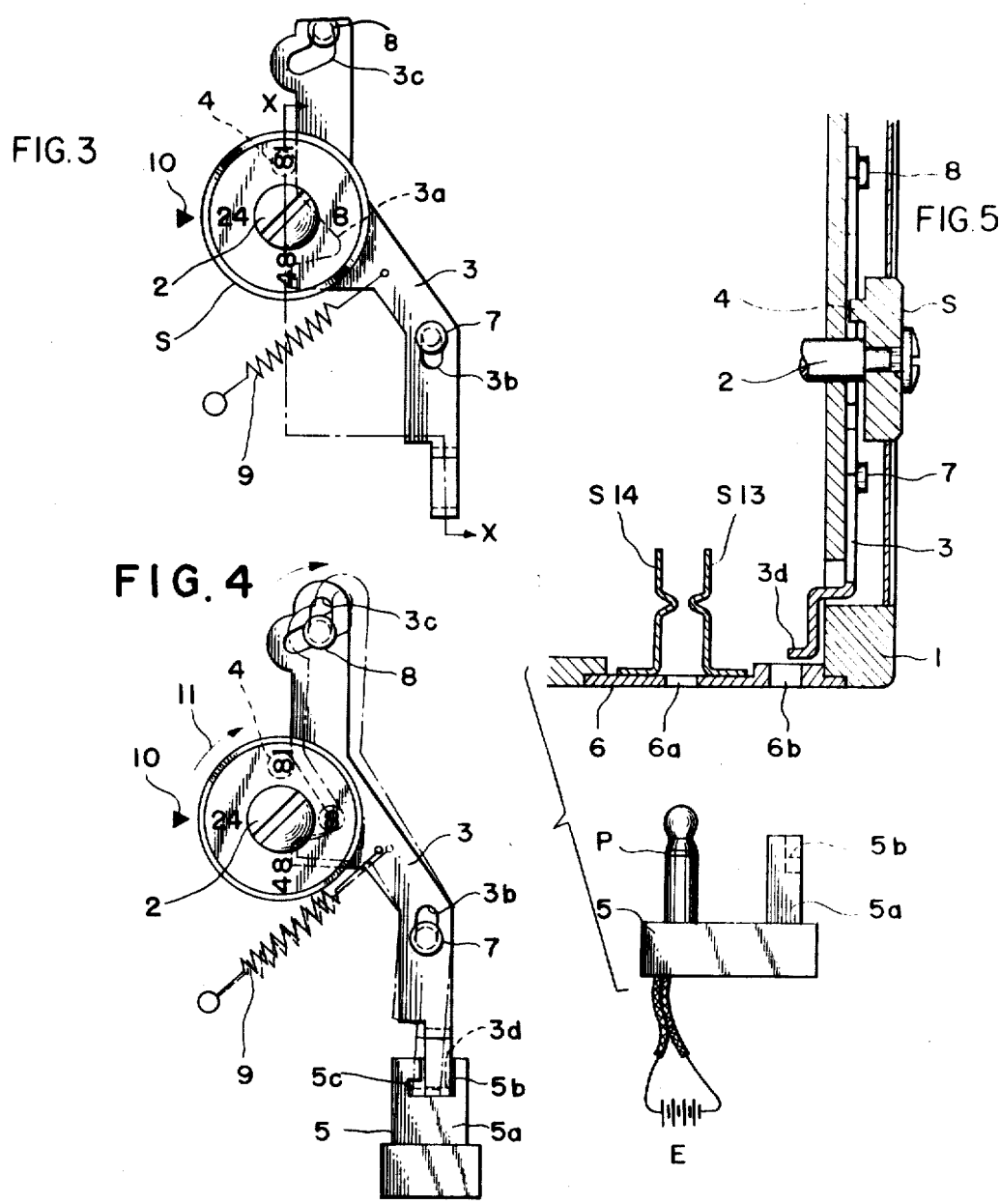

INTERLOCK DEVICE FOR MULTIPLE SPEED MOTION PICTURE CAMERA UTILIZING EXTERIOR POWER SOURCE

BACKGROUND OF THE INVENTION

Generally with cinematographic cameras, the film speed, i.e. the number of the exposed frames (or exposures) per one second is changed by the same mechanism that indicates the frame number converting part. With a small portable cinecamera driven by a motor, however, the power source battery for high-speed cinematography is not usually kept inside the camera a smaller lower voltage battery is provided which is necessary and sufficient for ordinary cinematography with 24-frame or less cinematographic speed, and when a higher speed, such as 48-frame or 64-frame, is necessary, some other supplemental battery is used or the battery is converted to a higher voltage source. Therefore, both the power source conversional operation and the frame number conversional operation are necessary. With the conventional cinecamera, however, there is no coordination between the power voltage conversion and the frame number conversion by the frame number converting part and each conversion is done separately, which may result in an incorrect power conversion for a desired frame speed or vice versa.

SUMMARY OF THE INVENTION

A primary object of the present invention is to provide control devices which prevent undesired film speed operation which may be caused by a wrong coordinative operation of the power source and frame number conversions. A second object is to provide control devices according to which an ordinary speed cinematography as is indicated by the frame number converting part is achieved independently of the power source voltage conversion. A further object is to provide control devices which prevent undesired film speed by automatically cutting off the power supply to the motor when the power voltage is set for an ordinary cinematography and the frame number conversion for a high-speed cinematography. Still another object of the present invention is to provide a locking device which prevents a wrong coordinative operation of the power source voltage and frame number conversions.

BRIEF DESCRIPTION OF THE DRAWINGS

FIG. 2 is a control circuit showing the coordination mechanism between the power source voltage conversion with which a high-speed cinematography high-voltage source can be attached and the frame number conversion, and which is another preferred embodiment of the present invention, FIG. 3 is a side view showing a locking device which prevents a wrong coordinative operation of the power source voltage and frame number conversions, FIG. 4 is a side view showing the action of the device of FIG. 3, and FIG. 5 is a vertical section view along the line XX of FIG. 3.

DESCRIPTION OF THE PREFERRED EMBODIMENT

Figure 1:
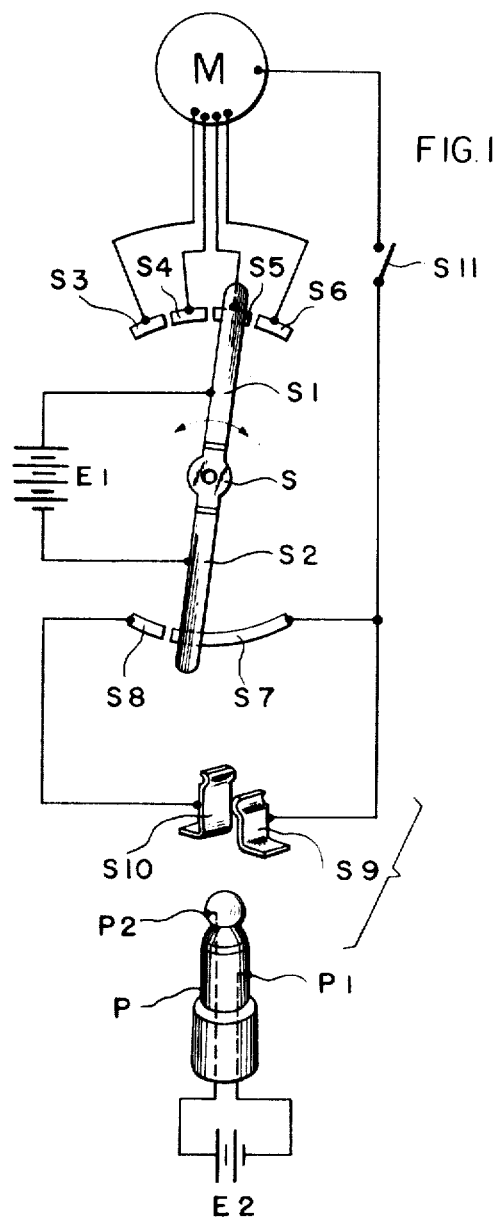
FIG. 1 is a control circuit showing the coordination mechanism between the power source voltage conversion with which an additional power source can be attached and the frame number conversion.

FIG. 1 shows a control circuit for obtaining the power source voltage conversion and the frame number conversion of a small cinecamera to which an additional power source can be attached for high-speed cinematography. The frame number converting part S which is rotatable pivoted has the contact pieces S1 and S2 which are insulated from each other and between which are connected the power source E1 for ordinary speed cinematography. The contact piece S1 constitutes, together with the known frame number converting contacts S3, S4, S5, S6 which are connected with and convert the rotation number of the motor M, a frame number converting piece according to the rotational position of S1. Contact piece S2 constitutes the control piece which has the ordinary speed cinematographic large contact S7 which makes contact with the said contact piece S2 opposite the said contacts S3, S4, S5, and the high-speed cinematographic small contact S8 which makes contact with the contact piece S2 when the said contact piece S1 is in contact with the said contact S6. The ordinary speed cinematographic frame number converting contacts S3, S4, S5, and the high-speed cinematographic frame number converting contact S6 are connected, in parallel to one another, with the motor M of which the other terminal is connected, through the main switch S11. The ordinary speed cinematographic large contact S7 and the high-speed cinematographic small contact S8 are connected to the plug jack contacts S9 and S10 which are insulated from each other and are mounted on the camera body. Jack contacts S9 and S10 make contact with both terminals P1 and P2 of the insertion plug P of the high-speed cinematographic additional power source E2.

With the devices described above, when the voltage of the ordinary speed cinematographic power source E1 is impressed through the ordinary speed cinematographic contact S3, the motor M rotates so as to provide 8-frame speed, and when the voltage E1 is impressed onto the contact S4 the motor rotation is for 18-frame speed, and when the voltage E1 is impressed onto the contact S5 then 24-frame speed is obtained, and further, when both the voltage E1 and the voltage E2 of the high-speed cinematographic additional power source are impressed together onto the frame number converting contact S6, the motor rotates so as to provide 48-frame speed. The mechanism described above is conventional and known, so that further explanation is not necessary for the purpose of the present invention.

Therefore, with the device shown in FIG. 1, when the frame number converting contact piece S1 is set onto the contact S3 without inserting the high-speed cinematographic additional power source, and the main switch S11 is set on, then the control piece S2 makes contact with the ordinary speed cinematographic large contact S7, constituting the circuit which connects the power source E1 with the frame number converting contact piece S1, contact S3, motor M, main switch S11, ordinary speed cinematographic large contact S7, control piece S2, and thus 8-frame speed is obtained. In the same way, when the contact piece S1 is set onto the contact S4, 18-frame speed is provided because the control piece S2 is in contact with the ordinary speed large contact S7, and further, when the piece S1 is set onto the contact S5,24-frame speed is obtained because the control piece S2 is again in contact with the ordinary speed large contact S7.

Even when the plug P of the high-speed additional power source E2 is inserted into the plug jack and each terminal of the plug P is in contact with the contact S9 and S10 of the plug jack, as long as the frame number converting contact piece S1 is set onto the ordinary speed cinematographic frame number converting contact S3, S4, or S5, the control piece S2 is in contact with the ordinary speed large contact S7 and the high-speed small contact S8 is cutoff from the motor M circuit, so that a cinematography can be performed with such a speed as is indicated by the frame number converting part which is united or cooperative with the frame number converting piece S1.

On the other hand, when the plug P of the high-speed additional power source E2 is inserted into the jack and the terminals P1, P2 are in contact with the contacts S9, S10 of the jack, and the piece S1 is set onto the high-speed contact S6, then the control piece S2 makes contact with the high-speed small contact S8, and the high-speed additional power source E2 is connected in series with the ordinary speed source E1 through the high-speed small contact S8 and the control piece S2, so that the added voltage is supplied to the motor circuit through the piece S1 and the high-speed contact S6, and, as the main switch 11 is set on, the desired high-speed cinematography can be obtained.

If the insertion of the plug P is not made, the motor circuit is cut off from the both power sources E1 and E2, and no operation is possible, so that wasteful film use can be prevented and also the cinematographer is informed of his mistake.

Another preferred embodiment shown in FIG. 2 has separately the high-speed cinematographic high voltage power source E3 besides the ordinary speed cinematographic power source E1 and the power source voltage can be converted by inserting or taking off the said source E3 through the plug and the jack. The converting part S has, just like the device in FIG. 1, the frame number converting contact piece S1 and the control contact piece S2 which are insulated from each other, and the said piece S1 makes or breaks contact, according to its rotation, with the ordinary speed cinematographic frame number converting contacts S3, S4, S5 and the high-speed cinematographic frame number converting contact S6, in accordance with which the control piece S2 makes contact with the ordinary speed cinematographic large contact S7 when the said piece S1 is in contact with the said contacts S3, S4, S5, and the piece S2 makes contact with the high-speed cinematographic small contact S8 when the piece S1 is in contact with the high-speed contact S6.

One terminal of the motor M is connected with the said contacts S3, S4, S5, S6, and the other terminal, after going through the main switch S11, divides into two branches, one of which is fixedly connected to the ordinary speed cinematographic large contact S7 and the other to the contact S9 of the plug insertion jack for the high-speed cinematographic power source. The other contact S10 of the jack is connected to the frame number converting contact piece S1. Further, a supplemental contact S12 is set which breaks contact with the contact S10 as the plug P is inserted and makes contact with S10 as the plug P is taken off. Between this supplemental contact S12 and the control contact piece S2 is connected the ordinary cinematographic power source E1. And between the terminals P1, P2 of the said plug P are connected the two poles of the high-speed power source E3.

Therefore, when the piece S1 is set onto any of the ordinary speed contacts S3, S4, S5 without inserting the plug P into the jack, because the control piece S2 is in contact with the ordinary speed large contact S7, the circuit is closed which includes the ordinary power source E1, supplemental contact S12, contact S10, piece S1, motor M, ordinary cinematographic large contact S7, piece S2 and back to the power source E1, and the motor M is driven by the voltage of the ordinary cinematographic power source E1.

When the plug P of the high-speed power source E3 is inserted by mistake, the circuit which includes the ordinary source E1 is not closed because the contact S10 and the supplemental contact S12 are broken off, and instead, the circuit which connects the high-speed source E3, terminal P2, contact S10, piece S1, either one of the contacts S3, S4, S5, motor M, main switch S11, contact S9, terminal P1, is closed to become the motor circuit, and thus the motor M is to be driven by the high-speed cinematographic power source E3. In such a case, however, the rotation speed of the motor M can be kept equal with the speed caused by the voltage impression of the ordinary speed cinematographic power source E1 by setting the known governor mechanism (not shown in the Figure) to the driving axle of the motor M, or by other means.

On the other hand, when the contact piece S1 is set onto the high-speed cinematographic frame number converting contact S6 with the plug of the high-speed power source E3 inserted, then the voltage of the high-speed power source E3 is impressed onto the motor M through the contact piece S1 and the contact S6 and high-speed cinematography is performed. Even if the plug P should be removed and the contact S10 and the supplemental contact S12 should come in contact, the control piece S2 is on the high-speed small contact S8 and is not connected with the motor M, and so neither the ordinary power source E1 nor the high-speed power source E3 constitutes the motor circuit and the camera is not driven, and thus the cinematographer is informed of his mistake.

The preferred embodiment shown in FIGS. 3, 4, 5 is a locking device which is set between power source conversion and frame number conversion in order to prevent incorrect operation.

On the outside surface of the frame number converting part S, which is rotatably pivoted onto the camera body 1, are shown the frame numbers 8, 18, 24, 48, and when one of the numbers meets the index 10 on the camera body 1 the part S is stopped there by a friction click mechanism and also the frame number converting contact piece as is shown in the said first preferred embodiment makes contact with the corresponding frame number converting contact and the motor circuit is completed. On the other side of the said converting part S is formed the projection 4.

The control plate 3, into whose vertical groove 3b and bent groove 3c are fitted the guide pins 7 and 8 which are mounted on the camera body 1, and which is pulled downwards and towards the frame number converting part S by the spring 9 extended diagonally, has the concave 3a which faces projection 4 when the plate 3 is set upwards against the spring 9 and the bent lever 3d which projects downwards. On the lower surface of the body 1 is fixed socket plate 6 in which are formed the jack 6a into which the plug is to be inserted and the opening 6b into which the control projection is to be fitted. On the jack 6a are mounted the contacts S13, S14 which are to make contact with both terminals of the plug which are insulated from each other and the bent lever 3d of the said control plate 3 is so constructed as to come just above the opening 6b.

The power source converting part 5, which has the additional power source or high-voltage power source E for high-speed cinematography, has the plug P which is to be fitted into the said jack 6a and the locking projection 5a which is to be fitted into the said opening 6b in parallel with the plug P. On the locking projection 5a are formed the groove 5b into which is to be fitted the bent lever 3d when the control plate 3 is being pulled by the spring 9 as is shown in FIG. 3, and the jaw 5c which catches and locks the bent part of the bent lever 3d when the control plate 3 is rotated clockwise (as is shown by the partially broken line in FIG. 4) after the lever 3d is fitted into the groove 5b.

Because of the construction described above, when the power source converting part 5 is off, the control plate 3 is in its downward position pulled by the spring 9 and rotation is prevented. However, while the frame number converting part is being rotated so as to indicate the 8-, 18- or 24-frame which is the ordinary cinematographic frame number, the conversion can be done freely for the projection 4 does not catch the control plate 3. However, when the frame number converting part begins to be rotated so as to convert the 48-frame high-speed cinematography, the projection 4 catches the side of the control plate 3, and, because the control plate 3 is prevented from rotating, the conversion to the 48-frame speed is prevented.

Then, as the power source converting part 5 is set in, the terminals of the plug P come in contact with the contacts S13 and S14 and the motor circuit is converted into the high-speed cinematographic power source. Also, at the same time, the groove 5b of the locking projection 5a catches the bent lever 3d of the control plate 3 which is pushed upwards by the bottom of the groove 5b against the spring 9, and consequently the concave part 3a of the control plate 3 shown by the solid line in FIG. 4 faces the rotational course of the projection 4 as is shown by the broken line, and also the guide pin 8 is positioned inside the bent part of the bent groove 3c in the upper end of the control plate 3 that has been pushed upwards, so that the plate 3 is allowed to rotate clockwise (in FIGS. 3, 4) against the spring 9. Therefore, as the frame number converting part S is rotated in the direction of the arrow 11 (in FIG. 4) so as to indicate the 48-frame cinematography, the projection 4 rotates along the concave 3a and pushes the control plate 3 in the last stage of its rotation and rotates it clockwise and with this rotation the bent part of the bent lever 3d shifts inside the groove 5b of the locking projection 5a and catches the jaw 5c and locks the power source converting part 5 preventing it from being disengaged. Therefore, unless the frame number converting part is converted back to the ordinary cinematographic frame number, the power source converting part is made to indicate the ordinary cinematographic frame number while the power source converting part is being set on, the cinematography can be performed just as indicated by the frame number converting part, just as it was described above.

With the use of such a locking part as has been described above, such control circuits as have been shown in the first and second preferred embodiments are not necessarily needed, and it will be sufficient if the mere switching conversion is performed by the frame number converting part.

What we claim is:

1. Apparatus for switching the film drive speed in accordance with the desired frame speed in a camera having a first battery for normally charging the motor to drive the film and a second battery for driving the film at higher than normal frame speeds, comprising:
    rotatable means for providing and indicating a desired frame speed,
    means actuated by said rotatable means, said means including a projecting element,
    means engaging a plug on said camera housing for providing a connection to said second battery, said means including an interlock for preventing rotation of said rotatable means by engagement with said projecting element, thereby preventing rotation of said rotatable means.

2. Apparatus as in claim 1 wherein said means actuated by said rotatable means further includes two guide apertures and said camera housing includes means for engaging said guide apertures in either one of two positions, said actuating means includes cammed means engaging said rotatable means whereby said rotatable means is shifted to one of two positions with a given rotation of said rotatable means.

3. Apparatus as in claim 2 wherein said engaging means includes an aperture for receiving said projected element in a given position of said rotatable means when said plug is engaged with said camera housing.

4. Apparatus as in claim 3 wherein said rotatable means includes a projecting flange which engages said cammed means to rotate said actuating means so that said projecting element is received by said aperture to provide the highest film drive speed.